R. O. STEBBINS.
CANTEEN.
APPLICATION FILED MAR. 19, 1907.
929,337. Patented July 27, 1909.
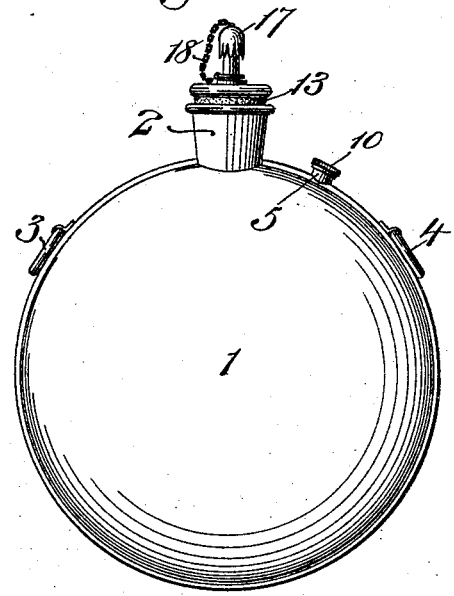
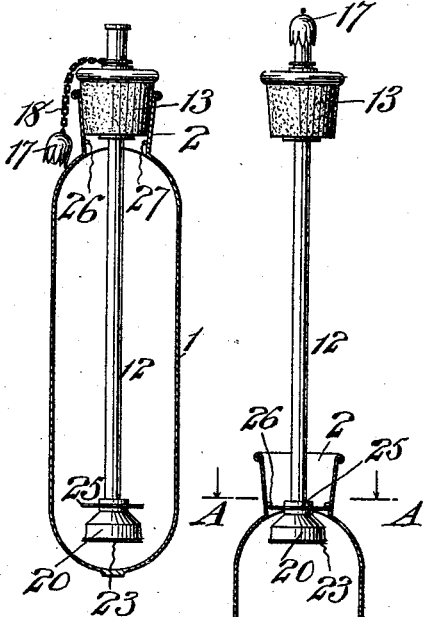
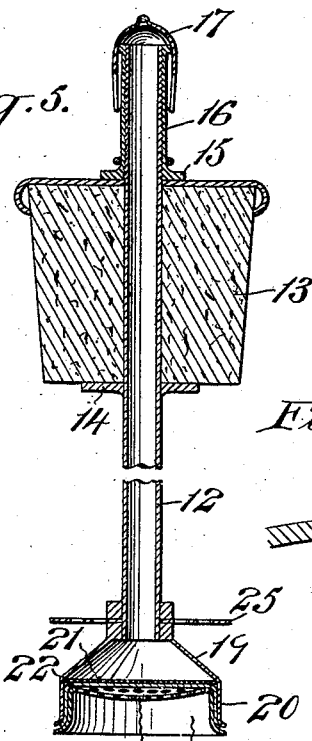
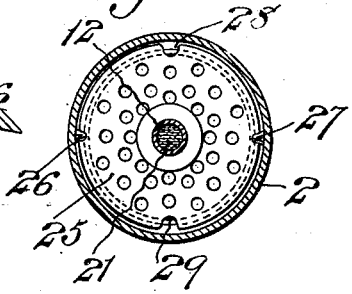
Witnesses:
F. George Barry
Henry Thieme
Inventor:
Roswell O. Stebbins
by Attorney

UNITED STATES PATENT OFFICE.

ROSWELL O. STEBBINS, OF NEW YORK, N. Y.

CANTEEN.

No. 929,337.   Specification of Letters Patent.   Patented July 27, 1909.

Application filed March 19, 1907. Serial No. 363,162.

*To all whom it may concern:*

Be it known that I, ROSWELL O. STEBBINS, a citizen of the United States, and resident of the borough of Manhattan, in the city and State of New York, have invented a new and useful Improvement in Canteens, of which the following is a specification.

This invention consists in certain improvements in canteens whereby the water may be strained as the canteen is being filled and in which a suction tube having a filter at its inlet, is provided for effectually filtering the water as it is drawn from the canteen through said tube.
This invention further consists in certain novel features of construction and combination of the several parts which will be hereinafter particularly described, whereby the canteen and its filtering device may be made very compact and strong and well adapted for the purposes intended.

A practical embodiment of this invention is represented in the accompanying drawings in which—
Figure 1 represents the canteen in side elevation with the filtering device in position therein and the outlet of the suction device closed. Fig. 2 is a transverse central section through the canteen, the filtering device being shown in full lines with the suction tube closure removed. Fig. 3 is a similar view showing the filtering device partially removed from the canteen, the parts being in the positions which they assume when ready for straining the water with which the canteen is to be filled. Fig. 4 is an enlarged transverse section taken in the plane of the line A—A of Fig. 3, looking in the direction of the arrows, Fig. 5 is an enlarged longitudinal central section through the filtering device, a portion of the suction tube being broken away, and Fig. 6 is a detail section showing the independent air valve for the canteen.

The body of the canteen is denoted by 1 and its mouth by 2. The canteen may be provided with the usual suspension rings 3 and 4. A manually controlled independent air valve for the canteen is located adjacent to its mouth 2, which valve in the present instance comprises a hollow plug 5 which is screwed into the peripheral wall 6 of the canteen and is provided with a port 7 open to the external air and a port 8 open to the interior of the canteen. Communication between the ports 7 and 8 is opened and closed by a screw plug 9 having a milled head 10, which plug serves as the valve proper. To prevent the entire removal of the plug and the tendency thus to lose the same, a stop 11 is provided for limiting the outward movement of the plug, after the ports 7 and 8 have been brought into open communication.

The canteen has a removable filtering device which is arranged to strain the water as the canteen is being filled and to filter the water as it is drawn from the canteen. The suction tube of the filtering device is denoted by 12 and it extends into the canteen through its mouth 2. A stopper 13 for the mouth of the canteen is carried by the suction tube 2 adjacent to its outlet, which stopper in the present instance is shown as being removably secured between an inner washer 14 fixed on the suction tube 12 and the flange 15 of a tubular sleeve 16 screwed on to the outlet end of the suction tube. This construction permits the replacement of one stopper by a new one whenever necessary. A removable closure 17 is provided for the outlet of the suction tube 12, which closure is herein shown as being attached to the suction tube by a flexible connection 18 for preventing the loss of the closure when removed from the outlet end of the suction tube. The inlet end of the suction tube 12 is provided with a filter as follows. The body portion of the filter comprises a conical part 19 and a depending annular flange 20. A perforated plate 21 is located within the body portion of the filter. A disk 22 of filtering material such, for instance, as chemically pure paper, is removably secured within the body portion for preventing the passage into the suction tube of microbic or other organic matter, as the water is drawn from within the canteen through the said tube. A cup-shaped member is arranged to have its side walls 23 cramp the edges of the disk of filtering material between it and the depending flange 20 of the body portion for removably holding the disk of filtering material in position. The bottom 24 of this cup-shaped member is perforated and is made concavo-convex so as to provide a space between it and the disk for permitting the water to come into contact with the entire filtering portion of the disk and for permitting a more ready suction of the water through the disk and perforated plate 21.

A strainer comprising a perforated disk 25 is carried on the suction tube 12 adjacent to the filter at its inlet end, which strainer is arranged to strain the water as it enters the canteen, as follows. The interior wall of the mouth of the canteen is provided with projections 26, 27, which extend inwardly a sufficient distance to overlap the edge of the strainer 25 so that the canteen may be supported by the strainer when the filtering device is partially withdrawn from within the canteen and hold the strainer in position to strain the water as it passes into the canteen through the mouth thereof. This strainer 25 is provided with recesses 28, 29, for permitting the entire removal of the filtering device from the canteen when the strainer 25 has been rotated with respect to the canteen to a point where the recesses 28, 29, are brought into alinement with the lugs or projections 26, 27.

In operation, when it is desired to fill the canteen with water, the filtering device is partially withdrawn from the canteen as shown in Fig. 3 and the air valve may be opened. The strainer will then be in position to prevent the entrance into the canteen of foreign matter of any appreciable size such, for instance, as leaves, twigs, bugs, etc. After the canteen has been filled, the filtering device is removed from the canteen in the manner hereinabove described and the foreign matter removed from the strainer. The filtering device is then inserted into the canteen and the mouth of the canteen closed by the stopper 13. When the person desires to take a drink, the closure 17 at the outlet of the suction tube is removed. The water is than sucked through the filter and tube, the disk of filtering material 22 serving to prevent the passage through the tube of microbic or other organic material which may be in the water. It will be observed that this disk of filtering material 22 may be readily removed and a new disk substituted when desired. Furthermore, it will be seen that the interior of the canteen may be closed tightly when the filtering device is locked therein and the independent air valve is closed.

In using the term "canteen" it is intended to cover all vessels to which this invention can be successfully applied, for accomplishing the objects set forth, viz: the straining of the water as the vessel is filled and the filtration of the water as it is drawn therefrom.

What I claim is:

1. The combination with a canteen, of a filtering device comprising an elongated suction tube extending into the canteen through its mouth, a stopper for the mouth of the canteen carried by the outer end of the tube, and a strainer secured to the inner end of the tube, the said strainer being so arranged that only the liquid which is being poured into the canteen will pass therethrough.

2. The combination with a canteen, of a filtering device, comprising a suction tube extending into the canteen through its mouth, a stopper carried by the outer end of said tube for the mouth of the canteen, a filter secured to the inner end of the tube, and a strainer for the mouth of the canteen, permanently secured to said tube exterior thereto, whereby the strainer alone will act as the canteen is being filled and the filter alone will act as the canteen is being emptied.

3. The combination with a canteen, of a removable filtering device comprising a suction tube extending into the canteen through its mouth, a filter at the inlet of the tube, and a strainer carried on said tube arranged to be interlocked with and released from the mouth of the canteen.

4. The combination with a canteen, of a removable filtering device comprising a suction tube extending into the canteen through its mouth, a filter at the inlet of the tube, a stopper carried on the tube for closing the mouth of the canteen, and a strainer carried on the tube arranged to be interlocked with and released from the mouth of the canteen.

In testimony, that I claim the foregoing as my invention, I have signed my name in presence of two witnesses, this fourteenth day of March, 1907.

ROSWELL O. STEBBINS.

Witnesses:
SELAH L. BENNETT,
CHARLES L. LESTER.